INVENTOR
WILLIAM W. GOTSHALL 3,493,532
PROCESS FOR CONTROLLING THE MODULUS OF AN ELASTOMERIC COMPOSITION WHICH CONTAINS PARTIALLY CALCINED COKE
William W. Gotshall, Orchard Lake, Mich., assignor to Marathon Oil Company, Findlay, Ohio, a corporation of Ohio
Filed Aug. 2, 1965, Ser. No. 476,504
Int. Cl. C08c *11/18*
U.S. Cl. 260—41.5                              20 Claims

ABSTRACT OF THE DISCLOSURE

The present invention comprises a process for controlling the modulus of vulcanizable elastomeric compositions containing from about at least 10 parts per 100 parts by weight of resin of a partially calcined ground coke containing from about 0.1 to about 10% by weight of volatiles by controlling the volatile content of said partially calcined coke.

---

Figure 1:
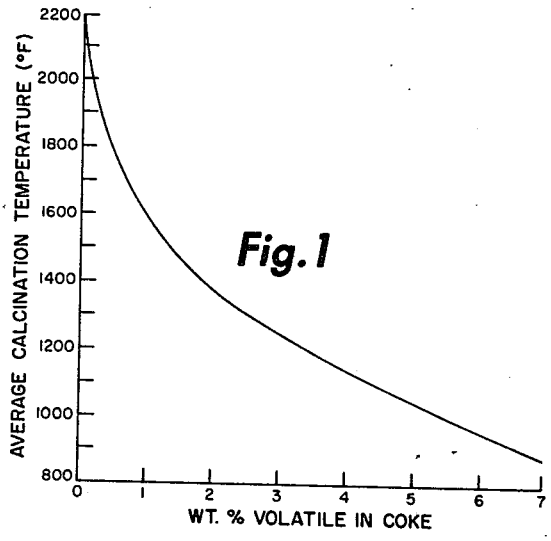

The present invention relates to elastomeric compositions having controlled moduli and processes for their manufacture.

The modulus of an elastomeric composition, commonly measured as the pounds per square inch required to stretch the compositions, for example, to 300% of their original length, it an important property in many applications. This modulus is used as an indication of the degree of reinforcement of the elastomeric composition by the carbon black. It is hypothesized that some bonding occurs between double bonds present in vulcanizable elastomeric materials and the carbon blacks used as fillers. The degree of this association between carbon black and vulcanizable materials is believed to be related to the reinforcement and thus to the modulus of the elastomer.

In addition, modulus has a direct bearing on the suitability of an elastomeric material for specific applications. For example, control of modulus in various parts of automobile tires is desirable. The treads should preferably have a high modulus for maximum wearability and resistance to damage. The tire carcass, on the other hand, should preferably have a low modulus for maximum riding comfort and minimum heat build up.

In the past, it has generally been necessary to change the types of carbon blacks being employed as fillers in the elastomeric compositions in order to vary the modulus. Use of lesser quantities of filler is often uneconomic and thus carbon blacks having different characteristics such as particle size, shape, configuration of individual particles, have necessarily been selected for applications requiring finished elastomeric compositions of various moduli. This selection of carbon blacks has been limited to the commercially available forms and compromise has sometimes been necessary.

The present invention so controls the production of new forms of carbon that the desired modulus in the finished elastomeric composition is obtained by altering the conditions under which the new form of carbon is produced. Since the conditions may be changed over a continuous, infinitely variable range, a wide selection of new forms of carbon, providing a virtually unlimited choice of moduli within the commercial ranges, is made available.

The present invention, therefore, offers a degree of control over the modulus of finished rubber compositions hitherto unavailable.

The present invention embodies the discovery that by the control of the degree of calcination that is, the percent volatile matter remaining in the coke, the modulus of the finished vulcanized compositions may be varied. The new forms of carbon of the present invention can provide high moduli and are especially valuable in the production of tire carcasses.

U.S. Patents 3,404,019 and 3,404,120 to W. W. Gotshall relate to the general field of ground carbonaceous agents in elastomeric compositions.

By vulcanizable elastomers is meant elastic polymeric materials which contain double bonds. Vulcanizable elastomers which may be used with the present invention include among others natural rubber, SBR (styrene-butadiene copolymer), buna-n (butadiene-acrylonitrile copolymer), butyl rubber, EPT (ethylene-propylene terpolymer with a third material which is a diolefin, e.g., isoprene), polyisoprenes, chloroprenes, and fluoroprenes. During the process of vulcanization which involves heating to temperatures of from about 250° F. to about 400° F., depending on the particular polymer being treated, the double bonds tend to react together and cause crosslinking which in turn affects the modulus of the finished elastomeric object.

The present invention, by varying the volatile content of the coke, apparently varies the degree of attachment between the coke and the double bonds of the vulcanizable elastomeric matrix and thus provides for close control and a wide range of variability of finished elastomeric modulus.

In general, from about 50 to about 300 parts per hundred of resin (elastomer) of the partially calcined coke of the present invention will be utilized. The coke will preferably have a particle size distribution of approximately 50% less than 1 micron in average diameter and 95% less than 2 microns in average diameter. The coke will, in general, contain from 0.1 to about 10% by weight of volatiles, more preferably 2–10% volatiles and most preferably will contain from about 1 to about 5% of volatiles.

It is preferable in the practice of the present invention that the coke be ground in a non-oxidizing atmosphere after it has been calcined.

The volatile content of the coke used in the present invention can be varied by changing either the average temperature to which the coke is subjected during calcination or the length of time to which the coke is exposed to calcining temperatures. This time-temperature-volatiles relationship will vary somewhat according to the coke being calcined, but FIGURE 1 shows the relationship for delayed petroleum coke being processed in a rotating hearth type of calcining furnace. Trial runs can readily be used to establish the proper time and temperature for any particular type of coke. The furnace used will preferably have minimum hold up or recycle of feed so that the residence times of the individual particles of coke will be as uniform as possible. Volatile content of the coke exiting from the furnace can be determined by conventional American Society for Testing Materials' tests.

While it is not intended that the invention be restricted by any mechanism hypothesized herein, it appears that the grinding of cokes produces particles having a high reactivity, possibly because of severing of bonds which may occur during the grinding process. Such severed bonds can react with the oxygen in the air and thereby lose their reactivity or, if properly protected as taught herein, they may be utilized to react with other ingredients in polymeric materials and produce polymers and especially rubbers having excellent physical properties.

In addition to the substantial economic advantages, the preferred forms of coke of the present invention exceed by a substantial margin the American Society for Testing Materials' specifications for "non-staining blacks."

In a preferred embodiment of the present invention, delayed petroleum coke produced in a conventional coke drum is crushed and screened to a particle size of less than approximately 2 inches and fed to a rotating hearth type of calcining furnace. The coke utilized in this preferred embodiment contains approximately 10% volatiles as measured by the American Society of Testing Materials' test D–271–58 which involves the heating of the coke to approximately 950° C. for 7 minutes and measurement of the resultant loss in weight. Petroleum coke is fed to the kiln at a rate of approximately 8,000 to 10,000 pounds per hour. The kiln has approximately 430 square feet of bed rotating on the turntable. The average depth of the coke bed is approximately 6 inches and average residence time in the kiln is approximately 20 minutes. The average temperature within the interior of the furnace is approximately 1200° F. for low modulus new forms of carbon, above 1600° F. for high modulus new forms of carbon. Air is blown into the furnace in a downward direction so as to mix with the volatiles coming upward from the coke bed. This mixing occurs above the bed and combustion is primarily in a zone about 6 to 12 inches above the bed. This combustion zone thus heats the coke with minimal loss of the coke by combustion.

The calcined coke leaves the kiln at the center of the rotating hearth and is conventionally quenched with a water spray and cooled by shaking with a vibrating screen conveyor.

The calcined coke has a volatile content of 4% by weight as determined by the above American Society for Testing Materials' test.

The coke is then mechanically ground to an average particle size of roughly 0.1 inch and fed to a Model No. 30–10 mill manufactured by Majac, Incorporated, of Sharpsburg, Pennsylvania. This is an autogenous grinding mill of the "hurricane" type and steam is preferably utilized as the grinding fluid. The velocity in the interior of the mill is approximately sonic at 700° to 800° F. and 100 to 150 p.s.i.g. nozzle pressure is maintained throughout the grinding section of the mill. The classifier of the mill is operated to separate out 5 micron or smaller particles and grinding is continued until the size distribution of the particles is as follows: 99% less than 5 microns; 50% less than 1.5 microns; 10% less than 0.5 microns. (All percentages in the present application are percent by weight unless otherwise specified.)

Care is taken to exclude oxygen, and the water from which the steam is prepared is preferably deaerated prior to entering the steam boilers. The entire apparatus is lagged with 2 inches of insulation in order to minimize condensation on the walls of the mill.

While in the classifier, the product is sprayed with approximately 0.1 to 1.0% based on the weight of the product of zinc stearate. In order to prevent the deleterious effect of oxygen contact, the particles are preferably individually coated with the zinc stearate until a relatively uniform coating is obtained.

When the coated coke product prepared as described above is utilized in natural rubber compositions containing approximately 65 parts of the new product per 100 parts of rubber, the coating material melts during the normal melting and vulcanizing processes which are performed conventionally. The resulting rubber composition is found to have a tensile strength comparable to the average tensile strength obtained when utilizing conventional thermal blacks and has a modulus of approximately 1,650 p.s.i. at 300%.

When cokes containing 2% and 6% volatiles, respectively, are similarly calcined, ground, coated, and formulated into natural rubber, the resulting rubber compositions after vulcanizing are found to have tensile strengths similar to the above and to have moduli at 300% of 1,975 p.s.i. and 1,500 p.s.i. respectively. These and other similar results are plotted in FIGURE 2. Similar results are obtained using coal cokes, and fluid petroleum cokes.

FIGURE 1 relates temperature to percent volatiles in coke after sufficient calcining to achieve substantially constant weight, generally from 2 to about 4 hours.

Figure 2:
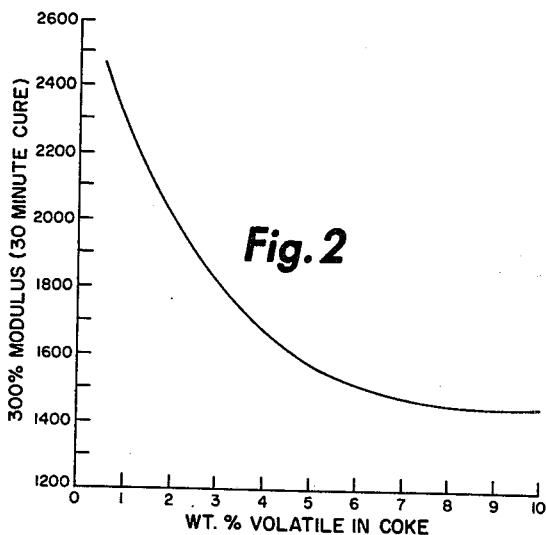

The control of the percent volatiles in the coke provides a method for the precise tailoring of the modulus of the finished rubber product to the intended application, according to relationships shown in FIGURES 1 and 2.

In general, as small a particle size as possible will be preferred in the product of the fluid grinding step, but average particle sizes of not more than 2.5 microns will be preferred and the preferred size distribution will be at least 90% less than 5 microns in size. The particle size will in all cases represent the average diameter of the individual particles after grinding. For reasons of economy, average diameters of about 1 micron or more will be preferred in order to reduce grinding costs.

The fluid energy or other types of mills may operate with a wide variety of inert non-oxidizing atmospheres. By non-oxidizing is meant atmospheres which do not react to any substantial degree under the conditions of grinding. In general, the oxidizing agents to be avoided are those commonly thought of as reactive, e.g., oxygen, ozone, ammonia, HCl, nitrogen oxides, etc. Steam is the most preferred atmosphere from the standpoint of economy, but nitrogen, helium, hydrogen, argon, and a wide variety of other gases commonly thought of as inert or reducing may be utilized. For maximum economy in grinding, gases of lower molecular weights, e.g., hydrogen, and steam, will be preferred.

The final grinding will preferably be accomplished in grinding mills of the "hurricane" type. Specially preferred are those autogenous mills manufactured by Majac, Incorporated, of Sharpsburg, Pennsylvania; the reductionizer manufactured by Reduction Engineering Corporation; and the Micronizer, manufactured by the Sturtevant Mill Company of Boston, Massachusetts. The mills are preferably operated in a conventional manner according to the manufacturer's recommendations.

The product from the mill can be immediately formulated into compositions to prevent contact with an oxidizing atmosphere. However, in most cases, it will be preferable to coat the coal from the mill with a coating agent as described in the above preferred embodiment. The coating agent should, of course, readily allow dispersion of the ground coal during compounding. The coating agent must also be non-deleterious to the compositions in which the ground coal of the present invention will be employed. A fugitive coating agent which evaporates or melts during processing, as for example, during the vulcanizing of rubber formulations, is particularly desirable. Coating agents having melting or boiling points of from 79 to about 250° F. are preferred.

In addition to liquids, certain finely divided powders, e.g., zinc stearate, stearic acid, and solid primary amines will act as effective barriers against oxidizing atmospheres. Also, in some instances, pelletizing can serve to protect the major portion of the ground coke from oxidizing atmospheres. Such pellets can be conventionally formed but should be sufficiently weak to disintegrate during normal compounding.

In general, rubber and other polymeric compounds formulated with the new forms of ground coke will have lower densities than comparable formulations with conventional carbon blacks. Since most carbon products are formulated to fill a given volume, this lower density permits lighter fabricated materials and results in a substantial saving in ingredients which are in virtually all cases sold on a weight basis. In most cases, no revision of formulations will be required and weight loading of the new carbon forms can be reduced by the ratio of their specific gravities to 1.8 (the approximate specific gravity of the presently used blacks).

What is claimed is:

1. In a process for producing an elastomeric composition having a given composition and comprising vulcanizable polymeric elastomer which contains double bonds and at least ten parts by weight of the elastomer of a coke having a given volatile content in the range of from about 0.1 to about 10% by weight based on the weight of the coke, the improvement comprising varying the modulus of said elastomeric composition without varying the percent of coke contained therein, said improvement consisting of the steps of increasing the modulus of said composition solely by decreasing the volatile content of said coke prior to its incorporation into said elastomeric composition or, decreasing the modulus of said composition solely by selecting and incorporating into said elastomeric composition a coke having a volatile content higher than said given volatile content.

2. The process of claim 1 wherein the elastomeric composition comprises a major portion of styrene-butadiene copolymer.

3. The process of claim 1 wherein the elastomeric composition comprises a major portion of butadiene-acrylonitrile copolymer.

4. The process of claim 1 wherein the elastomeric composition comprises a major portion of butyl rubber.

5. The process of claim 1 wherein the elastomeric composition comprises a major portion of ethylene-propylene terpolymer diolefin.

6. The process of claim 1 wherein the elastomeric composition comprises a major portion of polyisoprenes.

7. The process of claim 1 wherein the elastomeric composition comprises a major portion of vulcanizable polymeric elastomeric material containing double bonds and derived from chloroprenes.

8. The process of claim 1 wherein the elastomeric composition comprises a major portion of vulcanizable polymeric elastomeric material containing double bonds and derived from fluoroprenes.

9. In a process for producing an elastomeric composition of a desired predetermined modulus by mixing together ingredients comprising vulcanizable polymeric elastomer which contains double bonds and at least 10 parts per 100 parts by weight of the elastomer of ground coke to form a vulcanizable composition, and thereafter vulcanizing said vulcanizable composition, the improvement comprising partially calcining said coke to a volatile content within the range of from 2 to 10% based on the weight of the coke before mixing the elastomer and the coke, said calcining being performed at a time and for a temperature sufficient to reduce the volatiles in said coke to the extent necesary to produce an elastomeric composition of the desired predetermined modulus.

10. The process of claim 9 wherein the elastomeric composition comprises a major portion of styrene-butadiene copolymer.

11. The process of claim 9 wherein the elastomeric composition comprises a major portion of butadiene-acrylonitrile copolymer.

12. The process of claim 9 wherein the elastomeric composition comprises a major portion of butyl rubber.

13. The process of claim 9 wherein the elastomeric composition comprises a major portion of ethylene-propylene terpolymerdiolefin.

14. The process of claim 9 wherein the elastomeric composition comprises a major portion of polyisoprenes.

15. The process of claim 9 wherein the elastomeric composition comprises a major portion of vulcanizable polymeric elastomeric material containing double bonds and derived from chloroprenes.

16. The process of claim 9 wherein the elastomeric composition comprises a major portion of vulcanizable polymeric elastomeric material containing double bonds and derived from fluoroprenes.

17. In a process for producing ground coke of a desired predetermined modulus by partially calcining coke to a volatile content within the range of from 2 to 10% based on the weight of the coke wherein by the modulus of the coke is meant the modulus of cured standard elastomeric test mixes in which a uniform amount of said coke has been incorporated as a filler or reinforcement agent, the improvement comprising calcining said coke for a time and at a temperature to reduce the volatile content of said coke to the degree necessary to increase the modulus of said coke to produce a coke of the desired predetermined modulus, said time and temperature of calcination being insufficient to reduce the volatile content of said coke so as to increase the modulus of said coke substantially above said desired predetermined modulus, and grinding the coke to a particle size distribution of at least 50% less than one micron and at least 95% less than 2 microns.

18. The process of claim 9 wherein the coke is ground in a non-oxidizing atmosphere after it has been calcined.

19. The process of claim 1 wherein the coke is ground in a non-oxidizing atmosphere after it has been calcined.

20. The process of claim 17 wherein the coke is ground in a non-oxidizing atmosphere after it has been calcined.

References Cited

UNITED STATES PATENTS

| | | | |
|---|---|---|---|
| 2,991,268 | 7/1961 | Langan | 260—41 |
| 2,378,246 | 1/1942 | Rush | 252—289 |
| 3,203,916 | 8/1965 | Voet | 260—23.7 |
| 3,264,240 | 8/1966 | Segura et al. | 260—28.5 |
| 1,807,884 | 6/1931 | Wiegano. | |

FOREIGN PATENTS

| | | |
|---|---|---|
| 850,473 | 10/1960 | Great Britain. |
| 1,070,817 | 12/1959 | Germany. |
| 1,071,332 | 12/1959 | Germany. |
| 897,555 | 3/1945 | France. |
| 552,340 | 4/1943 | Great Britain. |

ALLAN LIEBERMAN, Primary Examiner

U.S. Cl. X.R.

23—209.1; 106—307; 260—763

PO-1050
(5/69)

UNITED STATES PATENT OFFICE
CERTIFICATE OF CORRECTION

Patent No. 3,493,532      Dated Feb. 3, 1970

Inventor(s) W. W. Gotshall

It is certified that error appears in the above-identified patent and that said Letters Patent are hereby corrected as shown below:

Col. 1, line 30 - "it" should read --is--

Col. 4, line 55 - "79" should read --70--

Col. 5, line 56 - "necesary" should read --necessary--

SIGNED AND
SEALED
JUL 28 1970

(SEAL)
Attest:

Edward M. Fletcher, Jr.
Attesting Officer

WILLIAM E. SCHUYLER, JR.
Commissioner of Patents